C. A. TYLER.
APPARATUS FOR REMOVING SURPLUS STARCH FROM STARCHED ARTICLES.
APPLICATION FILED APR. 24, 1911.

1,013,337.

Patented Jan. 2, 1912.

UNITED STATES PATENT OFFICE.

CHARLES A. TYLER, OF WILKES-BARRE, PENNSYLVANIA, ASSIGNOR OF ONE-HALF TO FRANK C. KUSCHEL, OF WILKES-BARRE, PENNSYLVANIA.

APPARATUS FOR REMOVING SURPLUS STARCH FROM STARCHED ARTICLES.

1,013,337. Specification of Letters Patent. Patented Jan. 2, 1912.

Application filed April 24, 1911. Serial No. 623,116.

*To all whom it may concern:*

Be it known that I, CHARLES A. TYLER, a citizen of the United States, and resident of Wilkes-Barre, county of Luzerne, State of Pennsylvania, have invented certain new and useful Improvements in Apparatus for Removing Surplus Starch from Starched Articles, of which the following is a specification.

The object of the present invention is to provide an apparatus suitable for removing the surplus starch from starched articles and for collecting and preserving the same so that it may be used in further starching operations.

The invention comprises a perforated plate or surface sufficiently rigid to support the starched article while the same is being smoothed and the surplus starch rubbed out of it. The perforations are sufficiently numerous to permit the starch to pass through the plate and into a receptacle below it. A layer of porous fabric, such as cotton cloth is preferably stretched over the plate to provide a smooth support for the starched articles.

Figure 1:
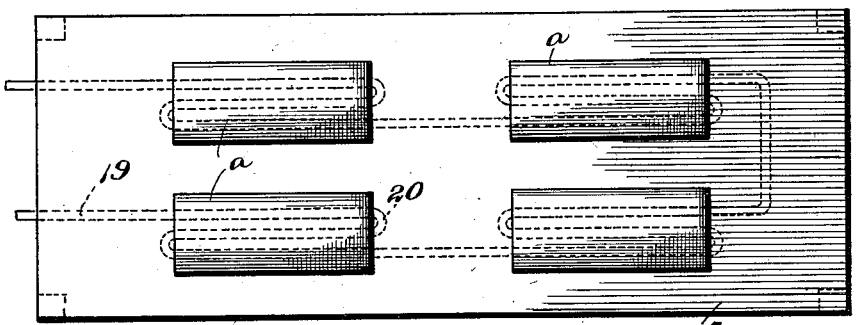
Figure 2:
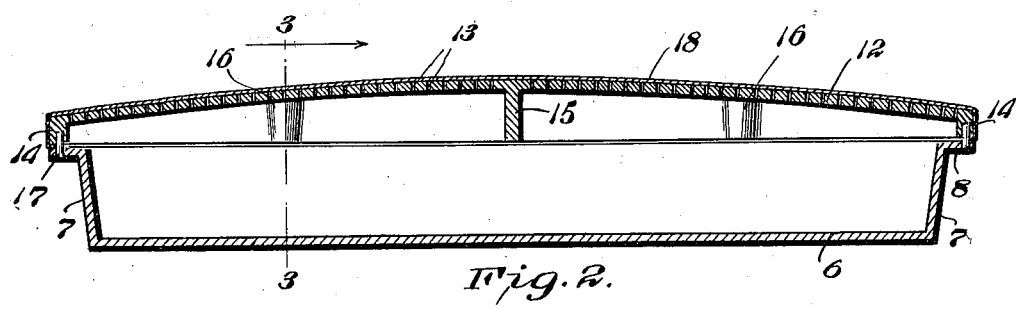
Figure 3:
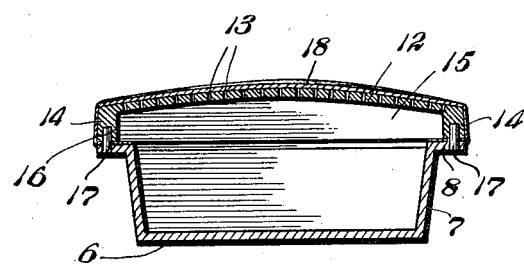

The invention will be described in detail in connection with the accompanying drawings, in which:

Figure 1 is a plan view of a table provided with several of the starch removing devices; Fig. 2 is a longitudinal sectional view of one of the devices; and Fig. 3 is a transverse section about on the line 3—3 of Fig. 2.

Referring to the drawings 5 indicates the table or support, and *a* the individual starch removing devices thereon. Each one of these devices comprises a pan 7 adapted to fit in an opening in the table and having flanges 8 arranged to rest on the margin of the opening to support the pan. Each pan is provided with a top plate 12 having numerous perforations 13 and having flanges 14 adapted to rest on the flanges 8 of the pan. The cover is preferably convex, both longitudinally and laterally on its upper surface as shown in the drawings. Means are provided for removably holding the cover on the pan to prevent it from sliding when the starched articles are being rubbed thereon. As shown in the drawing the cover is provided with bosses 16 in which dowel pins 17 are fixed, and the flanges of the pan are provided with openings to receive these dowel pins. The pan may be readily removed from the table and the cover can be lifted from the pan in order that the pan may be emptied and the under side of the cover cleaned when desired.

The top of the plate or cover 12 is provided with a layer of fabric 18 which is porous and stretched smoothly. The margin of the fabric is secured in any suitable manner to the margin of the cover. As shown it is folded down over the flanges 14 and secured to the under side thereof. The convex form shown in the drawings is the preferred form of the cover or starching board as that shape facilitates smoothing out the articles and permits of the fabric 18 being smoothly and tightly stretched.

I preferably provide means for keeping the pans and the starch therein warm. As shown in the drawing a steam pipe 19 is used for this purpose, the same being located beneath the table and having the coil 20 beneath each of the pans.

In operation cuffs, collars, shirts and other articles saturated with starch are laid upon the fabric 18 and rubbed or pressed by the hand or with a suitable implement. This operation presses out all of the surplus starch which passes down through the article and the fabric 18 and through the perforations in the plate 12, dropping into the pan below. Any suitable receptacle may be substituted for the pan 6.

Having thus described the invention what I claim as new and desire to secure by Letters-Patent is:

1. In an apparatus for removing surplus starch from starched articles, the combination with a pan or receptacle for surplus starch; of a cover therefor including a perforated concavo-convex plate provided with depending flanges, and means coöperating with the pan or receptacle for preventing lateral movement of the cover thereon, and a porous fabric over said plate, whereby the surplus starch may be pressed from an article through the fabric and plate into the receptacle.

2. In an apparatus for removing surplus starch from starched articles, the combination with a receptacle for the surplus starch, of a rigidly supported cover therefor comprising a perforated plate having its upper surface of double convex curvature, and a porous fabric arranged thereover, whereby the surplus starch may be pressed through the fabric and plate into the receptacle.

3. In an apparatus for removing surplus starch from starched articles, the combination with a pan or receptacle for receiving the surplus starch; of a cover therefor comprising a perforated plate having reinforcing means on its under side, means adapted to prevent lateral movement of the cover with respect to the pan or receptacle, and a porous fabric arranged on the upper surface of the cover and secured at its edges, whereby the starched articles may be laid on the fabric and the starch pressed from the article through the fabric and plate into the pan or receptacle.

In testimony whereof I affix my signature in presence of two witnesses.

CHARLES A. TYLER.

Witnesses:
FRANK C. KUSCHEL,
M. J. CLARKE.

Copies of this patent may be obtained for five cents each, by addressing the "Commissioner of Patents, Washington, D. C."